Oct. 28, 1958 H. S. YAKE ET AL 2,857,690
DRAGLINE CLEARING BUCKET
Filed May 16, 1956 2 Sheets-Sheet 1

INVENTORS
HERMAN S. YAKE
LYLE L. YAKE
BY Arthur Robert
Atty.

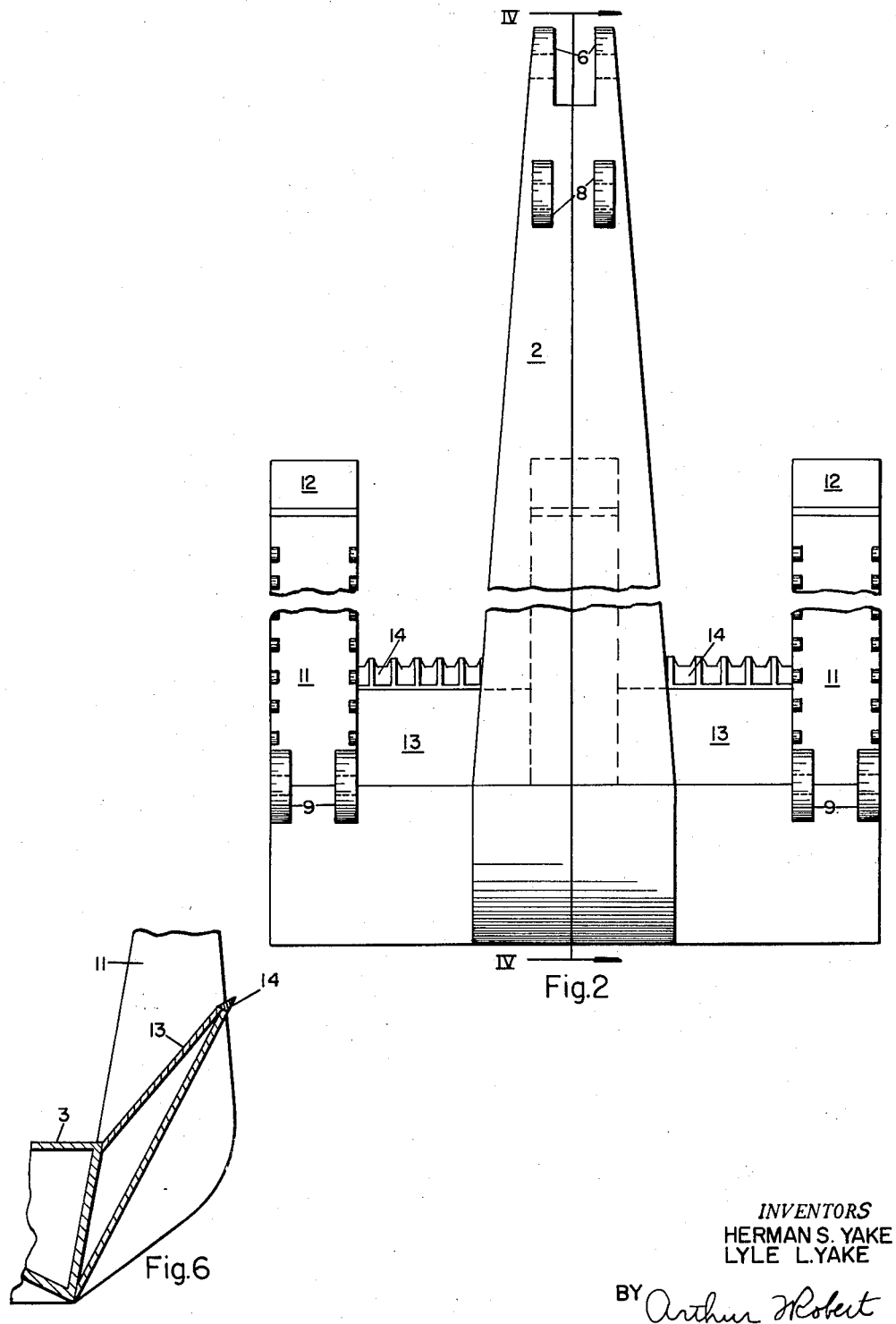

United States Patent Office 2,857,690
Patented Oct. 28, 1958

2,857,690

DRAGLINE CLEARING BUCKET

Herman S. Yake, Evansville, and Lyle L. Yake,
Green County, Ind.

Application May 16, 1956, Serial No. 585,325

7 Claims. (Cl. 37—120)

Dragline clearing buckets of the open-ended trough type are used to work in various ways, in land clearing operations, including the following: to work above the ground in pulling over trees which are too large to be treated as brush; to work into the ground in cultivating the sub-surface to loosen and uproot the root systems of brush, undergrowths, fallen trees and tree stumps; to work along the ground in uprooting brush, etc., and in raking the surface clear of all trash; to pick up the trash encountered during raking and cultivating operations; and to dump the picked-up trash at a given dump point. None of the dragline clearing buckets heretofore proposed perform all of the foregoing operations in a satisfactory manner.

The principal objects of the present invention are: to provide a dragline clearing bucket of the open-ended trough type which will perform all of the foregoing operations in a highly satisfactory manner; to provide one which may be readily manipulated in an effective manner above the ground to uproot or topple trees; to provide one which will cultivate the sub-surface deeply and thereby loosen and uproot extensive root systems without picking up and conveying large quantities of the soil; to provide one which will hold and effectively resist the dislodgment of the trash picked up during raking and cultivating operations; and to provide one which, when inverted, will dump its collected trash easily and quickly.

Our invention resides in the provision of a bucket construction of J-shaped design having a relatively long and narrow spine, which cooperates with a relatively wide bight and a correspondingly wide scoop, composed of transversely spaced cultivator tines, to form the three walls of a trough, which is open and relatively unobstructed at its opposite ends, at its mouth, on its scoop side between tines and on its spine side along opposite sides of the spine. A bucket of this open character is relatively inexpensive to make. It is effective in pulling over and conveying or raking trees since its open space on the tine and spine sides, enables the operator to use the tines of the bucket in gripping the tree and to use the open-ended trough in conveying it. Its tines enable it to loosen the soil without scooping up and conveying large quantities of the soil, and, by making the tines of substantial or appreciable length, deep and effective cultivation becomes possible. It has proven effective in picking up brush and retaining brush growth and fallen trees and, since its structure is relatively open, it can dump picked-up trash readily.

A dragline clearing bucket, embodying our invention, is illustrated in the accompanying drawing wherein:

Fig. 2 is a top plan view of the bucket as it appears in Fig. 1;

Fig. 6 is a section taken along line VI—VI of Fig. 5.

Figure 1:
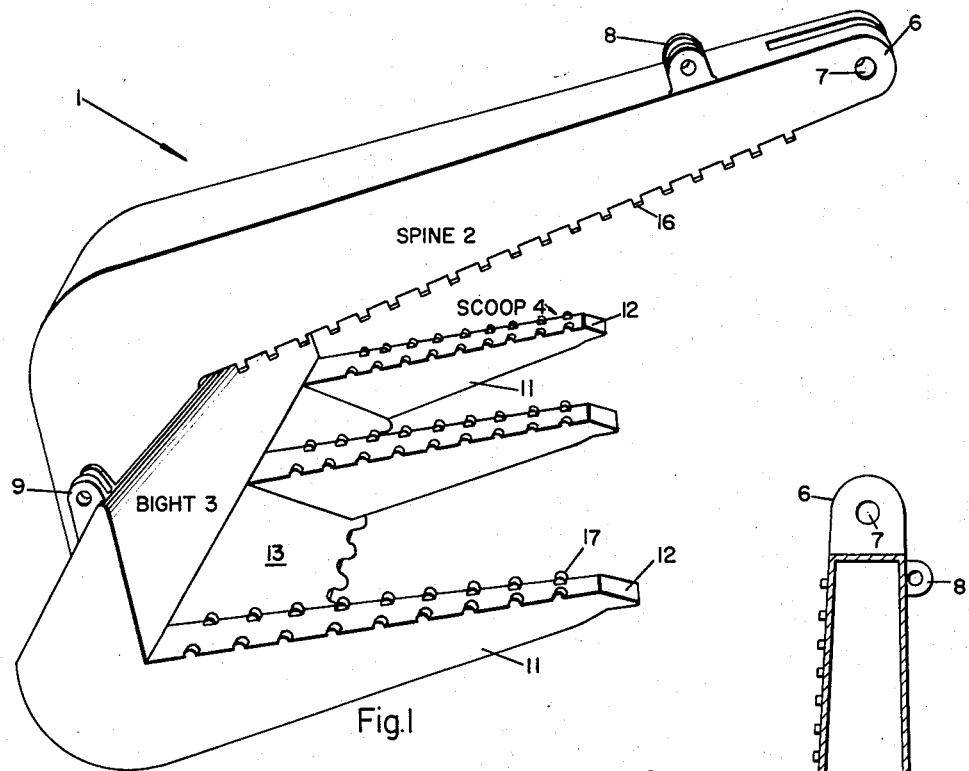
Fig. 1 is a perspective view of the bucket.
Figure 5:
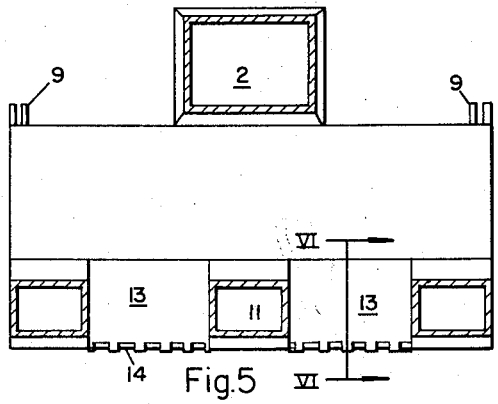
Fig. 5 is a section taken along line V—V of Fig. 4.
Figure 3:
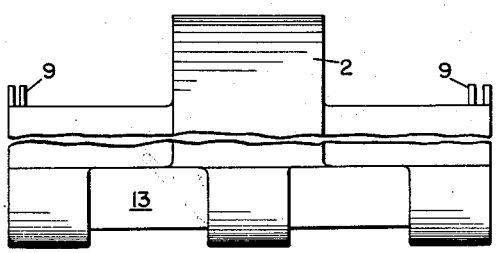
Fig. 3 is a bottom plan view of the bucket as it appears in Fig. 2, this view being broken from one end of the trough to the other to reduce the drawing space required by it.
Figure 4:
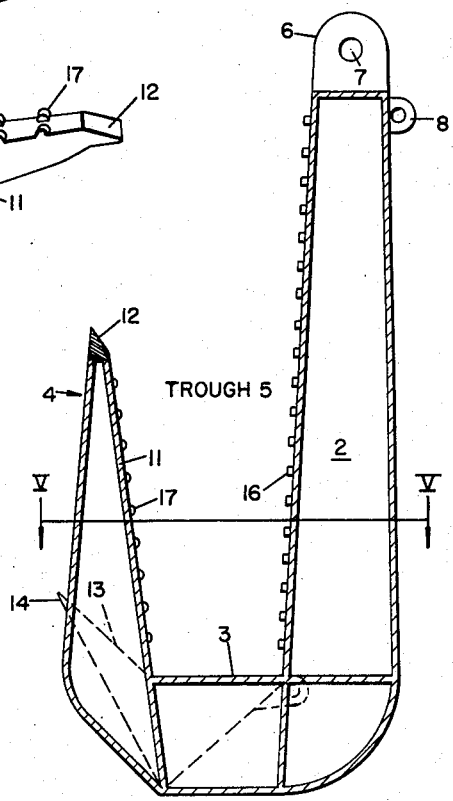
Fig. 4 is a section taken along line IV—IV of Fig. 2.

The design of our bucket, which is illustrated in the drawing, comprises: a J-shaped hook 1 having a spine 2, a bight 3 and a scoop 4 respectively forming the three walls of an open-ended trough 5.

The spine 2, which is rectangular in cross section, tapers toward its outer end where it is centrally slotted to provide a pair of ears 6 which are transversely bored at 7 to receive a dragline (not shown). The back face of the spine, near the slot between ears 6, is provided with a pair of rearwardly projecting lugs 8 to receive the rigging cable. The inner end of the spine 2 is relatively narrow in comparison with the transverse width of the bight 3, which is rigidly welded or otherwise firmly secured to the spine. As a consequence, the ends of the bight 3 project transversely far beyond the transverse margins or outer sides of the spine.

The projecting ends of the bight 3 are provided on the rear side with rearwardly projecting lugs 9, to receive other rigging cables which, cooperate with the rigging cable secured to lugs 8, to provide a means for manipulating the clearing bucket so as to place its trough horizontal in some operations, such as raking, vertical in others, such as tree toppling, and upside down in dumping operations. Before passing, it may be noted that while the bight 3 of the trough may be cross sectionally shaped, as desired, it is shown as being triangularly shaped in cross section except where it is intersected by an extension of the tines on the scoop.

The scoop 4 is preferably of the same width as the trough bight; hence, substantially wider than the spine. It is composed of several tines 11, preferably three in number, these tines being transversely spaced. Each tine is hollowed, preferably being rectangular in cross section and made to taper longitudinally toward its free end where it terminates in a tooth 12. The latter should be heat treated for hardness. The tine bight 13, between tines, may be of any shape. Preferably, it is inclined forwardly toward the front or ground-engaging side of the tines to provide a knifelike edge 14 on the front side. This knifelike edge 14 preferably is hardened and it may be toothed as shown. The minimum depth of the space between tines 11, from their bights 13 to their free ends 12, may be one-half the width of the space between tines but preferably is substantially greater than said width. The maximum depth preferably is about twice said width. In the preferred embodiment, both the minimum and maximum depths should range between one and one-half and two and one-fourth times the spacing between tines.

The trough 5, formed by the spine 2, bight 3 and scoop 4, tapers in width inwardly toward the bight 3. This trough is open and unobstructed at its opposite ends, at its mouth, on its tine side between its tines and on its spine side along opposite sides of the spine. The depth of this trough, from its mouth to its bight 3, preferably is greater than the average width of the trough from its spine 2 to its scoop 4. The depth of the trough is, of course, substantially less than the length of the spine.

With this arrangement, the dragline bucket operator, in handling trees, may manipulate the bucket with its open-ended trough either extending vertically or horizontally as it moves into engagement with the trees. Where trees, having a trunk diameter less than the spacing between tines, are being uprooted or toppled, the operator may advantageously manipulate the bucket to position its trough horizontally and cause the tree to pass into the space between tines and lie across the trough on one side of the spine or the other. In this way, the three is penetrated by the toothed edge 14 of the tine bight and effectively gripped by the bucket. With an effective grip, the tree may be uprooted by lifting it or toppled over. Where large trees are being toppled, the trough can be arranged vertically and the bucket moved to cause the tines to penetrate the trunk of the tree.

In raking up fallen trees and other trash, the trough is arranged horizontally so that its axis is parallel with the tree trunk. Usually, the operator tries to center the tree on the bucket so that the drag effect on opposite sides of the bucket will not tend to dislodge the tree from the trough. This tendency is substantially resisted by respectively providing each corner of the spine 2, on the trough side of the spine, and each corner of each tine 11, on the trough side of the tines, with teeth 16 and 17.

In cultivating operations, the tines loosen the dirt without scooping it up and conveying it along the ground. The tine bights cut roots which lie in their paths and assist in scooping trash into the trough.

From the foregoing, it will be appreciated that we have produced a simple, effective and relatively inexpensive type of bucket. The design used enables the bucket to be constructed from welded metal plates, no special materials being required except for the hardened teeth members. In operation, the bucket is highly flexible. It will handle brush, undergrowth, trees and stumps quickly and easily. It can be used in cleaning ditches and removing brush from the edges of lakes and streams. It can be installed on conventional dragline equipment in a manner of minutes. No special operator training is necessary because the same basic operator manipulations are used. It will move a large amount of growth in each operation and it can be dumped at any time during an operation; hence, its use saves time.

Having described our invention, we claim:

1. A dragline bucket of the open-ended trough type comprising: a J-shaped hook having a relatively long and narrow spine, a relatively wide bight and a correspondingly wide scoop composed of cultivator tines, said spine, bight and scoop being rigidly connected together to form the three walls of a trough, which is open and relatively unobstructed at its opposite ends, at its mouth, on its scoop side between tines and on its spine side along opposite sides of the spine.

2. The bucket of claim 1 wherein: the depth of the trough is greater than its average width from scoop to spine.

3. The bucket of claim 1 wherein: the tines are substantially as long as the scoop.

4. The bucket of claim 1 wherein: the depth of the space between tines is not less than one-half and not greater than two and one quarter times the width of such space.

5. The bucket of claim 1 including a tine bight between adjacent tines at their bases which inclines forwardly toward the free ends of the tines and outwardly from the trough.

6. The bucket of claim 5 wherein: said tine bight terminates in a cutting edge.

7. The bucket of claim 1 wherein: the spine and the tines are provided on their trough side with teeth.

References Cited in the file of this patent

UNITED STATES PATENTS

| 1,597,005 | Ball et al. | Aug. 24, 1926 |
| 2,338,831 | Whitcomb et al. | Jan. 11, 1944 |
| 2,669,042 | Swank | Feb. 16, 1954 |

FOREIGN PATENTS

| 539,683 | Great Britain | Sept. 19, 1941 |
| 102,412 | Sweden | Aug. 26, 1941 |